(12) United States Patent
Williams

(10) Patent No.: US 11,994,050 B2
(45) Date of Patent: May 28, 2024

(54) CATCH CAN OIL FILTER

(71) Applicant: K&N Engineering, Inc., Riverside, CA (US)

(72) Inventor: Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 17/832,144

(22) Filed: Jun. 3, 2022

(65) Prior Publication Data

US 2022/0298939 A1 Sep. 22, 2022

Related U.S. Application Data

(63) Continuation of application No. 16/162,719, filed on Oct. 17, 2018, now Pat. No. 11,352,922.

(60) Provisional application No. 62/574,684, filed on Oct. 19, 2017.

(51) Int. Cl.
*F01M 13/04* (2006.01)
*F01M 13/00* (2006.01)
*F02M 25/06* (2016.01)

(52) U.S. Cl.
CPC .... *F01M 13/0416* (2013.01); *F01M 13/0011* (2013.01); *F01M 13/04* (2013.01); *F02M 25/06* (2013.01); *F01M 2013/0438* (2013.01)

(58) Field of Classification Search
CPC ........... F01M 13/0416; F01M 13/0011; F01M 2013/0438; F01M 13/0033; F02M 25/06
See application file for complete search history.

(56) References Cited

U.S. PATENT DOCUMENTS

| | | | |
|---|---|---|---|
| 2,532,888 A * | 12/1950 | Brown | F01M 13/0011 220/372 |
| 3,262,721 A | 7/1966 | Knight | |
| 4,627,406 A | 12/1986 | Namiki et al. | |
| D403,416 S | 12/1998 | Shelton et al. | |
| 6,345,614 B1 | 2/2002 | Shureb | |
| 9,702,282 B2 | 7/2017 | Peck et al. | |
| 2009/0265895 A1 | 10/2009 | Box | |
| 2010/0139585 A1* | 6/2010 | Frazier, Jr. | F02M 35/10222 123/573 |
| 2013/0025564 A1 | 1/2013 | Setiadi | |
| 2013/0205726 A1* | 8/2013 | Wada | B01D 46/2411 55/447 |

(Continued)

*Primary Examiner* — Syed O Hasan
(74) *Attorney, Agent, or Firm* — Rutan & Tucker LLP; Hani Z. Sayed

(57) ABSTRACT

An apparatus and a method are provided for a crankcase breather vent assembly to direct blow-by gases out of an engine crankcase. A vent base comprising a generally cylindrical vessel communicates received blow-by gases into an interior cavity of a breather vent that comprises a filter medium. Baffles disposed within an interior cavity of the vent base capture oil carried along with the blow-by gases. The captured oil is directed to an oil sump of the engine by way of a suitable hose. A bonnet fastenably receives the breather vent and is configured to reduce a buildup of oil residue on nearby engine components. An outer profile of the breather vent is tapered along a longitudinal dimension of the filter medium to facilitate unrestricted air flow through the filter medium when the bonnet is installed onto the breather vent.

6 Claims, 4 Drawing Sheets

(56) References Cited

U.S. PATENT DOCUMENTS

| | | |
|---|---|---|
| 2016/0273423 A1 | 9/2016 | Williams et al. |
| 2017/0218803 A1* | 8/2017 | Grover .................. F01M 13/04 |
| 2019/0210039 A1* | 7/2019 | Kuhn ....................... B04B 7/16 |

* cited by examiner

CATCH CAN OIL FILTER

PRIORITY

This application claims the benefit of and priority to U.S. patent application Ser. No. 16/162,719 filed on Oct. 17, 2018 and U.S. Provisional Application, entitled "Catch Can Oil Filter," filed on Oct. 19, 2017 and having application Ser. No. 62/574,684.

FIELD

The field of the present disclosure generally relates to filtration devices. More particularly, the field of the invention relates to an apparatus and a method for a catch can oil filter configured to direct blow-by gases out of an engine crankcase and return captured engine oil back to an oil sump of the engine.

BACKGROUND

A crankcase ventilation system generally serves as a controlled one-way passage for gases to be drawn out of a crankcase of an internal combustion engine. During internal combustion, a small portion of air-fuel mixture being combusted generally leaks from combustion chambers of the engine and enters into the crankcase. The leaked portion of air-fuel mixture generally is referred to as "blow-by" gases. A buildup of blow-by gases within the crankcase is continual during operation of the engine. If left unchecked, the blow-by gases increase in pressure within the crankcase, thereby causing oil leaks and other damage to the engine.

An early attempt to eliminate internal crankcase pressure was a road draft tube, typically comprising a pipe starting at a high location of the crankcase, such as a side of the engine or a valve cover on an overhead valve engine, and extending to an open end facing downward. During engine operation, when the vehicle is moving, airflow across the open end of the draft tube creates a draft that draws blow-by gases from the crankcase and vents the gases to the atmosphere. An air inlet to the crankcase, called a "breather," allows fresh air to enter the crankcase so as to clear out the blow-by gases.

A drawback to the road draft tube is that it does not function when the vehicle is not moving, or the vehicle moves too slowly to create a draft within the crankcase. Thus, slow-moving vehicles, such as postal vehicles and other delivery vehicles, tend to suffer from a rapid buildup of engine sludge due to poor crankcase ventilation. Moreover, vehicles that don't generate a draft on the tube regardless of their speed, such as boats, also suffer from sludge build up. Another drawback to the road draft tube is that the blow-by gases, comprising chiefly unburned hydrocarbons, are discharged directly into the atmosphere, thereby contributing to air pollution.

Modern positive crankcase ventilation (PCV) systems generally eliminate the problems associated with internal crankcase pressure and air pollution due to blow-by gases. A typical PCV system comprises a breather tube and a PCV valve. The breather tube connects the crankcase to a source of fresh air, typically clean air from the air filter body, whereby the fresh air is drawn through the breather tube into the engine. The air circulates within the interior of the engine, capturing blow-by gases, including any moisture present. The air is then drawn out of the interior of the engine though a PCV valve and passed to an intake manifold of the engine, such that the blow-by gases are combusted during engine operation.

It will be recognized that not all internal combustion engines use PCV valves. For example, engines that are not subject to emission controls, such as certain off-road engines, dragsters, and other performance vehicles use techniques other than the PCV valve to eliminate internal crankcase pressure. In absence of the PCV valve, there is no need for a breather tube, and thus it is desirable to install a performance crankcase breather vent. Often times, the performance crankcase breather vent resembles a small air filter configured to ensure only clean fresh air is drawn into the crankcase.

A drawback to conventional crankcase breather vents is that oil contained in the blow-by gases tends to form a residue on components near the breather vent, such as on top of the valve covers. Build-up of an oily residue is particularly undesirable in the case of decorative engine components, particularly on show-room quality components that may have a chromed finish. What is needed, therefore, is a performance crankcase breather vent that is configured to remove the oil from blow-by gases so as to reduce oil build-up nearby the breather vent, as well as decrease the amount of unburned hydrocarbons that are passed to the atmosphere.

SUMMARY

An apparatus and a method are provided for a crankcase breather vent assembly that is configured to be coupled with a crankcase breather outlet of an internal combustion engine so as to direct blow-by gases out of the crankcase and return captured engine oil to an oil sump of the engine. The crankcase breather vent assembly comprises a breather vent that includes a filter medium, retained between a base and a cap, and a fitting receiver providing an opening into an interior cavity of the breather vent. A vent base comprised of a generally cylindrical vessel is received into the fitting receiver. The vent base is configured to communicate blow-by gases received into an interior cavity of the vent base into the interior cavity of the breather vent. A multiplicity of baffles disposed on opposite sides of the interior cavity of the vent base are configured to force blow-by gases to undergo a tortuous path through the interior cavity, such that the baffles capture oil carried along with the blow-by gases. The captured oil may then be directed, by way of a suitable hose, back to an oil sump of the engine. The crankcase breather vent assembly further comprises a bonnet that is configured to reduce a buildup of oil residue on nearby engine components. The bonnet is comprised of a cup-shaped member having a cylindrical wall, an enclosed end, and an open end disposed opposite of the enclosed end and configured to receive the breather vent into an interior of the bonnet. An outer profile of the breather vent is tapered along a longitudinal dimension of the filter medium, such that a diameter of the breather vent near the cap is greater than the diameter near the base of the breather vent. The tapering of the diameter is configured to facilitate an unrestricted air flow through the filter medium when the bonnet is installed onto the breather vent.

In an exemplary embodiment, a crankcase breather vent assembly that is configured to be coupled with a crankcase of an internal combustion engine comprises: a breather vent comprised of a filter medium, retained between a base and a cap, and a fitting receiver providing an opening into an interior cavity of the breather vent; a vent base comprised of a generally cylindrical vessel that is received into the fitting receiver and configured to communicate blow-by gases from the vent base into the interior cavity of the breather vent; and a bonnet comprised of a cup-shaped member configured to extend over the breather vent.

In another exemplary embodiment, an outer profile of the breather vent is tapered along a longitudinal dimension of the filter medium, such that a diameter of the breather vent near the cap is greater than the diameter near the base of the breather vent, the tapering of the diameter being configured to facilitate an unrestricted air flow through the filter medium when the bonnet is installed onto the breather vent. In another exemplary embodiment, the bonnet includes an enclosed end and an open end disposed opposite of the enclosed end, the enclosed end being configured to mount to a top of the breather vent such that the open end allows an unrestricted air flow through the filter medium when the bonnet is installed onto the breather vent. In another exemplary embodiment, the bonnet is configured to reduce a buildup of oil residue on nearby engine components.

In another exemplary embodiment, the vent base comprises one or more inlets disposed along a side of the vent base and an outlet disposed at a bottom of the vent base, the one or more inlets configured to receive blow-by gases into the interior cavity of the vent base, and the outlet configured to direct oil captured from the blow-by gases to an oil sump of the engine. In another exemplary embodiment, the one or more inlets and the outlet are configured to receive suitable fittings and hoses that communicate engine blow-by gases from the crankcase of the engine. In another exemplary embodiment, the one or more inlets and the outlet comprise tapered threads suitable for engaging with various threaded fittings, such that fluid-tight seals are formed when the threaded fittings are tightened into the one or more inlets and the outlet. In another exemplary embodiment, the one or more inlets and the outlet are comprised of flanges protruding from the vent base and configured to receive hoses extending from the engine, the hoses being securable by way of suitably sized hose clamps. In another exemplary embodiment, a multiplicity of baffles are disposed in an alternating sequence on opposite sides of the interior cavity of the vent base and are configured to direct blow-by gases along a tortuous path through the interior cavity, such that the baffles capture oil carried along with the blow-by gases, thereby decreasing the oil content of the blow-by gases reaching the breather vent and reducing oil residue deposition on engine components near the breather vent. In another exemplary embodiment, the captured oil drains toward the outlet and may be directed to the oil sump of the engine by way of a suitable hose.

In another exemplary embodiment, the vent base is comprised of cast aluminum and a mount is incorporated into the vent base to facilitate fastening the crankcase breather vent assembly within an engine bay, such that the breather vent is positioned atop the vent base. In another exemplary embodiment, the vent base is comprised of steel and configured to be coupled with a mounting bracket by way of a suitable hose clamp. In another exemplary embodiment, the mounting bracket is configured to be mounted within an engine bay, such that the vent base is supported in an upright configuration wherein the breather vent is positioned atop the vent base and the outlet is positioned at a bottom of the vent base.

In an exemplary embodiment, a method for a crankcase breather vent assembly to be coupled with a crankcase of an internal combustion engine comprises: retaining a filter medium between a base and a cap to form a breather vent; forming an opening in the base into an interior cavity of the breather vent; configuring a vent base to communicate blow-by gases into the interior cavity; arranging a multiplicity of baffles inside the vent base to capture oil carried with the blow-by gases; disposing one or more inlets along a side of the vent base; disposing an outlet at a bottom of the vent base to direct captured oil to an oil sump of the engine; and extending a cup-shaped bonnet over the filter medium of the breather vent.

In another exemplary embodiment, configuring the vent base further comprises configuring a generally cylindrical portion of the vent base to be received into the opening in the base. In another exemplary embodiment, arranging the multiplicity of baffles comprises disposing the baffles in an alternating sequence on opposite sides of the interior cavity of the vent base to direct blow-by gases along a tortuous path through the vent base. In another exemplary embodiment, disposing the one or more inlets and disposing the outlet further comprise configuring vent base to receive suitable fittings and hoses that communicate engine blow-by gases from the crankcase of the engine to the vent base. In another exemplary embodiment, extending the cup-shaped bonnet comprises configured the bonnet to be fastened to the cap, such that an open end of the bonnet allows an unrestricted air flow through the filter medium when the bonnet is installed onto the breather vent.

BRIEF DESCRIPTION OF THE DRAWINGS

The drawings refer to embodiments of the present disclosure in which.

Figure 1:
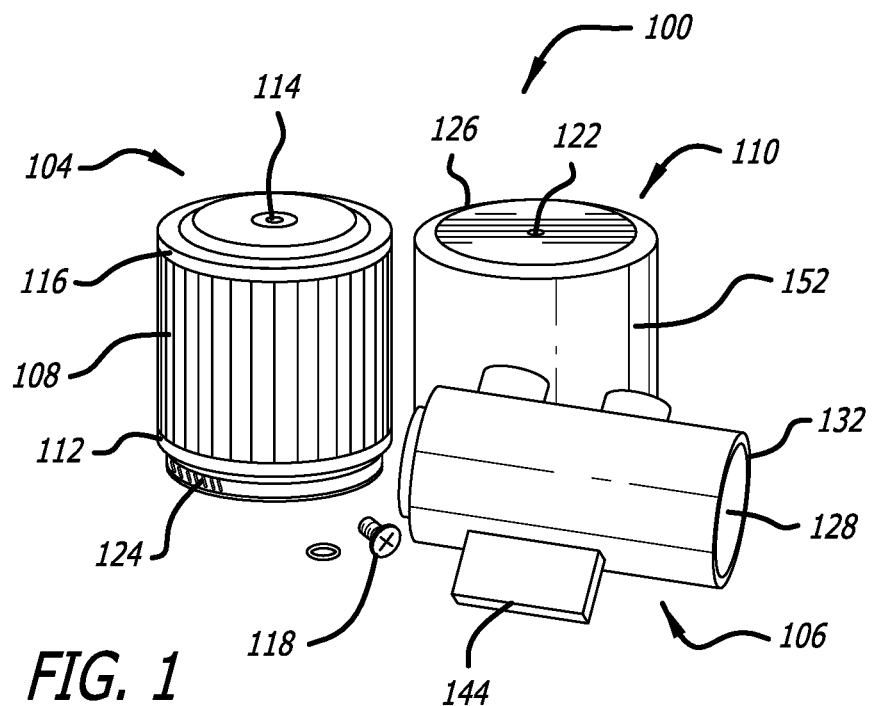
FIG. 1 illustrates an exemplary embodiment of a crankcase breather vent assembly that is configured to capture blow-by gases exiting an engine crankcase.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first flange," may be made. However, the specific numeric reference should not be interpreted as a literal sequential order but rather interpreted that the "first flange" is different than a "second flange." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Performance crankcase breather vents generally resemble small air filters that are configured to ensure only clean fresh air is drawn into an engine crankcase. A drawback to conventional crankcase breather vents is that oil contained in blow-by gases tends to form a residue on components near the breather vent, such as on top of engine valve covers. Embodiment presented herein overcome the drawbacks to conventional crankcase breather vents and provide a performance crankcase breather vent that is capable of removing oil from blow-by gases and decreasing the amount of unburned hydrocarbons that are passed to the atmosphere.

Although embodiments of the present disclosure may be described and illustrated herein in terms of a cylindrical breather vent, it should be understood that embodiments of the present disclosure are not limited to the exact shapes illustrated, but rather may include a wide variety of generally cylindrical shapes, generally circular, oval, round, curved, conical, or other closed perimeter shapes, that provide a relatively large surface area in a given volume of the breather vent.

Figure 2:
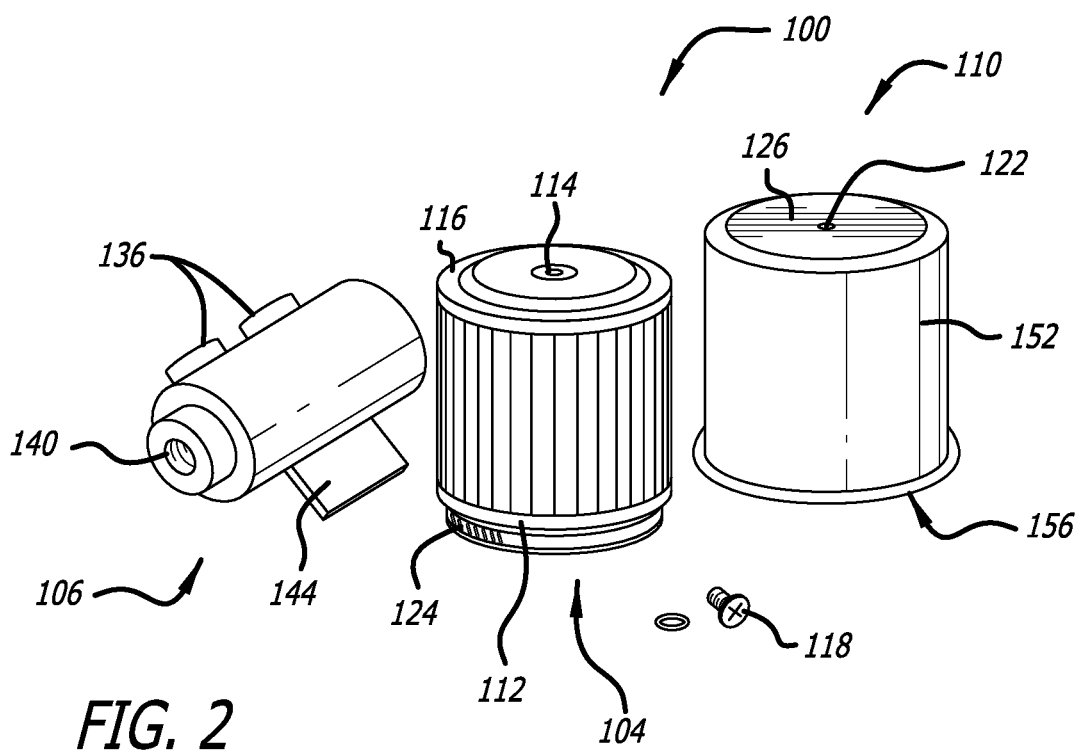
FIG. 2 illustrates the crankcase breather vent assembly of FIG. 1 comprising a vent base, a breather vent, and a bonnet configured to direct blow-by gases out of an engine crankcase and return captured engine oil back to an oil sump of the engine.
Figure 3:
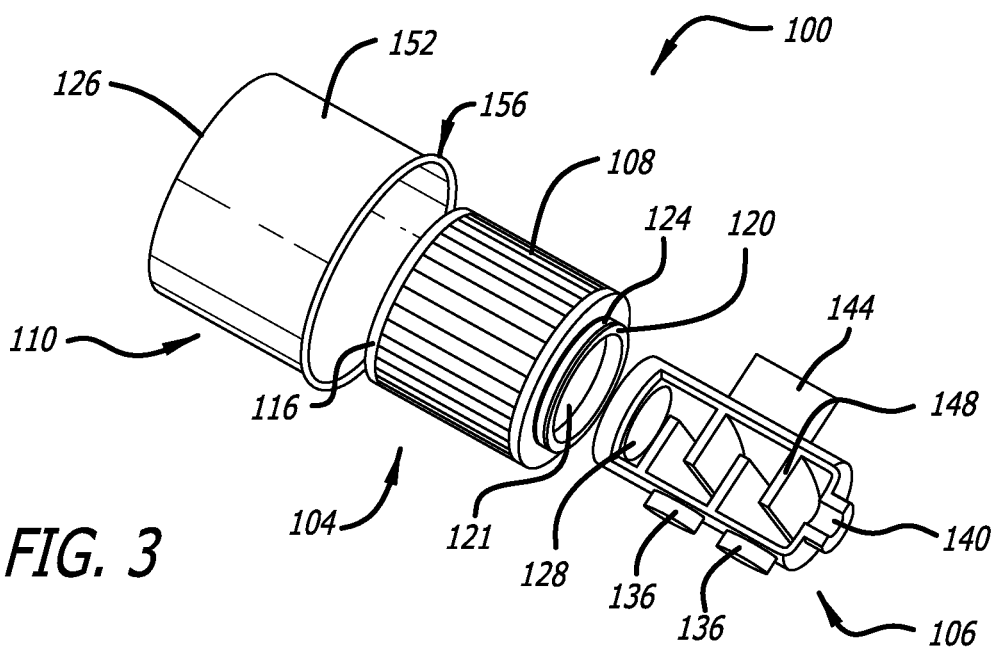
FIG. 3 illustrates a cutaway view of the vent base of FIG. 2, showing interior baffles configured to capture oil from blow-by gases flowing toward the breather vent.

FIGS. 1-3 illustrate an exemplary embodiment of a crankcase breather vent assembly 100 comprising a breather vent 104, a vent base 106, and a bonnet 110 according to the present disclosure. The crankcase breather vent assembly 100 is configured to be mounted within an engine bay of a vehicle and coupled with a crankcase breather outlet of an internal combustion engine so as to direct blow-by gases out of the crankcase.

In the embodiment illustrated in FIGS. 1-3, the breather vent 104 is comprised of a filter medium 108 that is retained between a base 112 and a cap 116. As best shown in FIG. 3, the base 112 further comprises a fitting receiver 120, which includes an opening 121 into an interior cavity of the breather vent 104, and a clamp 124. The cap 116 comprises a threaded hole 114 that is configured to receive a fastener 118 that may be used to fasten the bonnet 110 onto the breather vent 104. A hole 122 disposed in an enclosed end 126 of the bonnet 110 is configured to receive the fastener 118 so as to secure the bonnet 110 to the breather vent 104. The base 112 and cap 116 preferably are comprised of materials that are sufficiently durable and temperature resistant so as to retain their configuration during installation and operation when coupled with the crankcase of the engine.

The filter medium 108 circumferentially surrounds the interior cavity of the breather vent 104 such that the filter medium 108 creates an exterior perimeter of at least a portion of the cavity. An exterior cross-sectional shape of the breather vent 104 may be generally circular, oval, or otherwise shaped so as to increase the surface area available for air flow passage for a given volume of the interior cavity. The shape may be consistent along a longitudinal length, or may vary along the longitudinal length. In the illustrated embodiment, the outer profile of the breather vent 104 tapers along a longitudinal length of the filter medium 108, such that a diameter of the breather vent near the cap 116 is greater than the diameter near the base 112 of the breather vent. As will be appreciated, tapering the diameter of the breather vent near the base 112 facilitates an unrestricted air flow through the filter medium 108 when the bonnet 110 is installed onto the breather vent 104.

In some embodiments, a wire support may be incorporated into the filter medium 108 so as to provide additional strength and durability to the breather vent 104, thereby facilitating periodic cleaning and reusing of the breather vent 104 instead of discarding the breather vent after each application. In some embodiments, the filter medium 108 may be positioned between the wire support and one or more layers of a reinforcing material. For example, the wire support may comprise a wire screen positioned on an outer surface and an inner surface of the filter medium 108. In some embodiments, the wire screens may be comprised of powder-coated aluminum screen wire that is co-pleated along with the filter medium 108 so as to reinforce the breather vent 104. In some embodiments, additional or alternative reinforcements may be provided, as will be apparent to those skilled in the art.

The base 112 generally is configured to support the breather vent 104 and provide an interface between the breather vent and an interior cavity 128 of the vent base 106. As such, the fitting receiver 120 is configured to receive an open end 132 of the vent base 106, and the clamp 124 is configured to secure the open end 132 within the fitting receiver 120 such that blow-by gases that are passed into the interior cavity 128 of the vent base 106 are directed into the interior cavity of the breather vent 104 and then passed through the filter medium 108.

As best shown in FIG. 3, the vent base 106 is comprised of a generally cylindrical vessel having one or more inlets 136 disposed along a side of the vent base and an outlet 140 disposed at a bottom of the vent base, opposite of the open end 132. It is contemplated that the vent base 106 may be comprised of any of various suitable metals, such as cast aluminum, as well as any rigid plastic capable of coming into contact with engine oil and withstanding the temperatures within the engine bay during operation of the engine. The inlets 136 and the outlet 140 are in fluid communication with the interior cavity 128. A mount 144 incorporated into the vent base 106 facilitates fastening the crankcase breather vent assembly 100 within the engine bay, such that the open end 132 and the breather vent 104 are positioned atop the base vent 106. The inlets 136 and the outlet 140 are configured to receive suitable fittings and hoses that communicate engine blow-by gases from the crankcase of the engine. In some embodiments, the inlets 136 and the outlet 140 comprise tapered threads suitable for engaging with various threaded fittings, such that fluid-tight seals are formed when the threaded fittings are tightened into inlets and the outlet.

The inlets 136 are configured to receive blow-by gases from the crankcase and direct the gases into the interior cavity 128. A multiplicity of baffles 148 disposed on opposite sides of the interior cavity, in an alternating sequence, force the blow-by gases to undergo a tortuous path through the interior cavity 128 as they travel upward into the breather vent 104. As will be appreciated, the baffles 148 capture oil carried along with the blow-by gases. The captured oil drains toward the outlet 140 and then may be directed, by way of a suitable hose, back to an oil sump of the engine. The blow-by gases reaching the breather vent 104 are substantially depleted of oil, thereby reducing oil residue deposition on engine components near the breather vent.

In some embodiments, an upper-most of the inlet 136 may be placed in fluid communication with a breather inlet of the crankcase. Thus, clean air may be drawn into the crankcase by way of the upper-most inlet while blow-by gases are received into the interior cavity 128 by way of a lower-most of the inlets 136. It is contemplated that the baffles 148 will ensure that any blow-by gases entering into the upper-most inlet will be substantially depleted of oil and any other contaminants.

The bonnet 110 is configured to reduce buildup of oil residue on nearby engine components, as well as provide aesthetic appeal to the crankcase breather vent assembly 100. As best shown in FIG. 3, the bonnet 110 is a cup-shaped member comprised of a cylindrical wall 152 and an enclosed end 126, having an open end 156 opposite of the enclosed end. The open end 156 has a diameter that is relatively greater than the diameter of the cap 116, such that the breather vent 104 may be inserted into the interior of the bonnet 110. As shown in FIG. 2, a hole 122 is disposed in the center of the enclosed end 126 and is configured to allow passage of the fastener 118 through the enclosed end into the threaded hole 114 to fasten the breather vent 104 within the bonnet 110. As disclosed above, the breather vent 104 comprises a tapered diameter along a longitudinal dimension of the breather vent, extending from the cap 116 to the base 112. The tapered diameter is configured to provide an unrestricted air flow through the filter medium 108 when the bonnet 110 is installed onto the breather vent 104.

Figure 4:
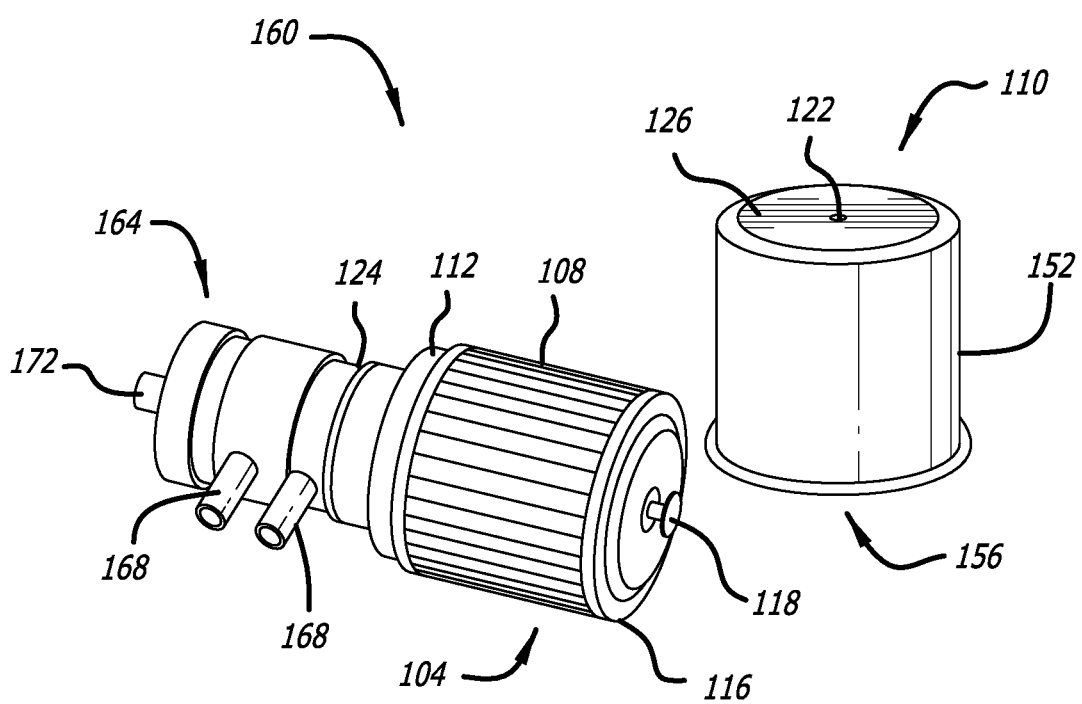
FIG. 4 illustrates an exemplary embodiment of a crankcase breather vent assembly that is configured to be mounted within an engine bay of a vehicle and coupled with a crankcase breather outlet of an internal combustion engine so as to direct blow-by gases out of the crankcase of the engine.
Figure 5:
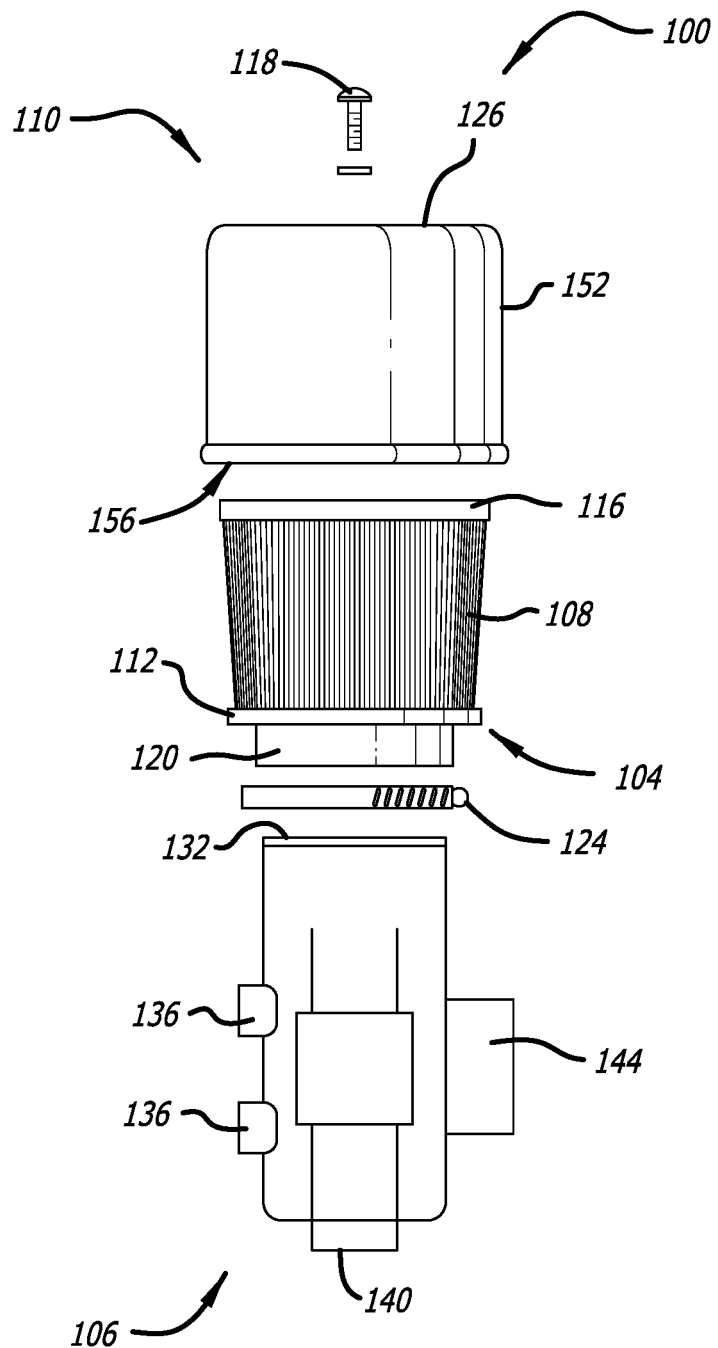
FIG. 5 is a schematic illustrating an exploded side-view of the crankcase breather vent assembly shown in FIG. 3.
Figure 6:
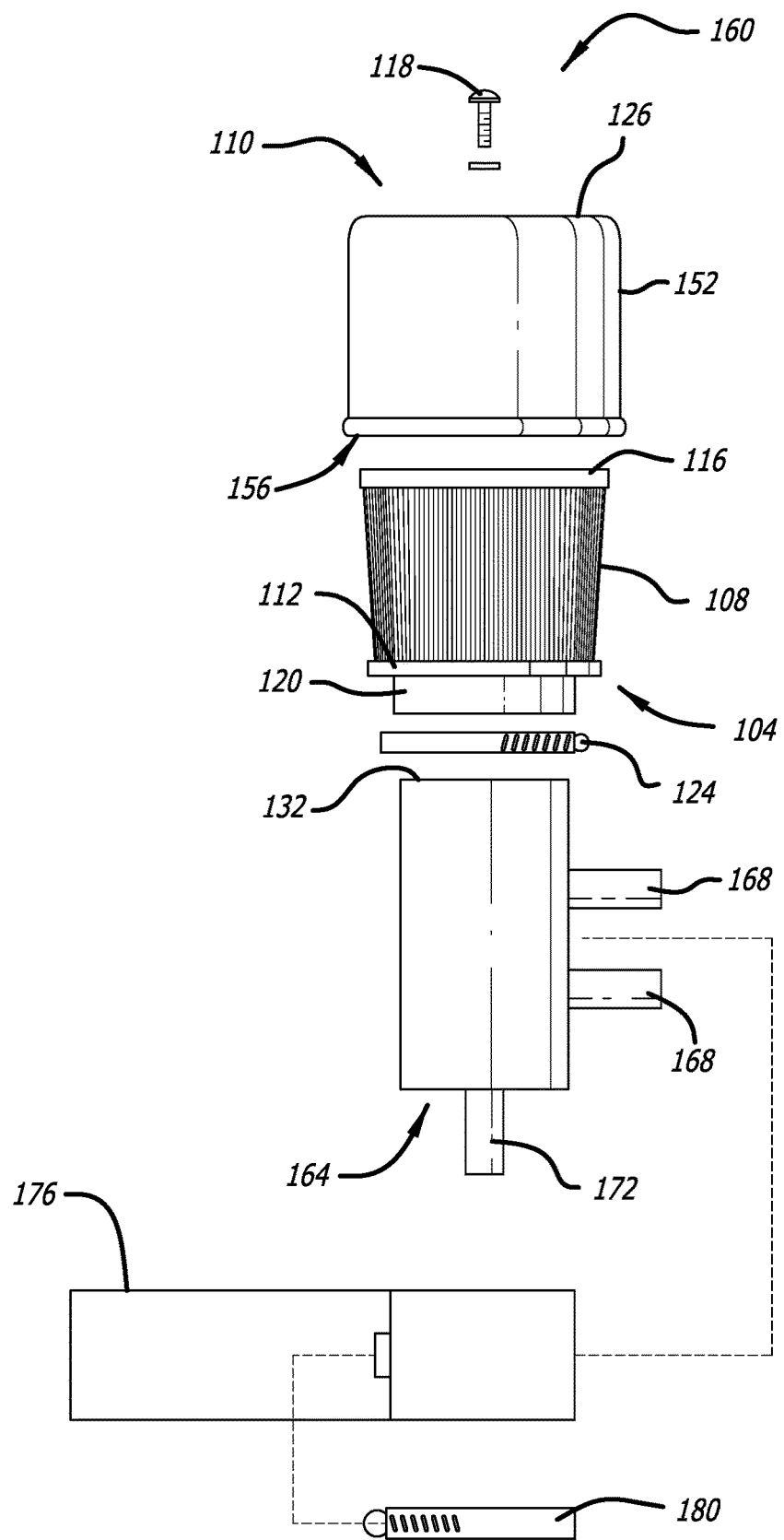
FIG. 6 is a schematic illustrating an exploded side-view of the crankcase breather vent assembly of FIG. 4 and a mounting bracket that may be coupled together by way of a hose clamp.

FIG. 4 illustrates an exemplary embodiment of a crankcase breather vent assembly 160 that is configured to be mounted within an engine bay of a vehicle and coupled with a crankcase breather outlet of an internal combustion engine so as to direct blow-by gases out of the crankcase. FIGS. 5-6 are schematics respectively illustrating exploded views of the crankcase breather vent assemblies 100, 160. The crankcase breather vent assembly 160 is substantially similar to the crankcase breather vent assembly 100 illustrated in FIGS. 1-3, with the exception that the crankcase breather vent assembly 160 is comprised of a vent base 164 having one or more inlets 168 disposed along a side of the vent base and at least one outlet 172 disposed at a bottom of the vent base. The vent base 164 preferably is comprised of steel, but in other embodiments the vent base 164 may be comprised of any of various suitable metals, as well as any rigid plastic capable of coming into contact with engine oil and withstanding temperatures within the engine bay during operation of the engine.

In the embodiment of FIG. 4, the inlets 168 and the outlet 172 are comprised of flanges protruding from the vent base 164 and are configured to receive hoses extending from the engine. It is contemplated that once the vent base 164 is mounted within the engine bay, the hoses extending from the engine may be pushed onto appropriate flanges and then secured by way of suitably sized hose clamps. As will be appreciated, the flanges preferably are coupled with the vent base 164 by way of welds, although other suitable techniques for coupling the flanges and the vent base may be practiced without deviating beyond the present disclosure.

As best shown in FIG. 6, the vent base 164 is configured to be coupled with a mounting bracket 176 by way of a hose clamp 180. It is contemplated that the mounting bracket 176 may be fastened within the engine bay, or directly attached to the engine, such that the vent base 164 is supported in an upright configuration wherein the breather vent 104 is positioned atop the vent base 164 and the outlet 172 is positioned at a bottom of the vent base. Thus, during operation of the engine, oil captured from blow-by gases may be collected within the vent base 164 and drained back to the oil sump of the engine by way of a hose connected to the outlet 172.

It is contemplated that a user of the breather vent 104 may periodically clean the filter medium 108 rather than replacing the breather vent 104, as is typically done with conventional crankcase breather systems. In some embodiments, cleaning the filter medium 108 comprises removing the fastener 118 from the bonnet 110 and lifting the bonnet from atop the breather vent 104. The clamp 124 may then be loosened so as to allow the open end 132 to be removed from the fitting receiver 120 of the breather vent 104. A water hose may be inserted through the fitting receiver 120 into the interior cavity of the breather vent 104, and water may be sprayed so as to flush contaminants from the filter medium 108. In some embodiments, cleaning the breather vent 104 may comprise spraying water onto the exterior of the filter medium 108, such that the water and contaminants drain from the exterior of the filter medium 108. It is envisioned that any of various suitable solvents may be applied to the filter medium 108 so as to loosen the contaminants before spraying with water. Once the filter medium 108 is sufficiently clean and dry, any of various filer oil compositions may be applied to the filter medium so as to enhance the filtration characteristics of the breather vent 104. Other cleaning methods will be apparent to those skilled in the art without deviating from the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A crankcase breather vent assembly for an internal combustion engine, comprising: a breather vent for cleaning air being drawn into a crankcase comprised of a filter medium retained between a base and a cap; a vent base for capturing oil from blow-by gases; a bonnet extending over the breather vent for reducing oil residue buildup on nearby engine components; in the multiplicity of baffles are configured to cause blow-by gases to traverse a tortuous path through the interior cavity; the tortuous path is configured to cause oil carried by the blow-by gases to collected on the multiplicity of baffles; one or more inlets are configured to receive blow-by gases from the crankcase into the interior cavity; an outlet is configured to drain captured oil from the interior cavity to an oil sump, and wherein an outer profile of the breather vent is tapered along a longitudinal dimension of the filter medium, such that a diameter of the breather vent near the cap is greater than the diameter near the base of the breather vent, the tapering of the diameter being configured to facilitate an unrestricted air flow through the filter medium when the bonnet is installed onto the breather vent.

2. The crankcase breather vent of claim 1, wherein the breather vent includes a fitting receiver providing an opening into an interior cavity of the breather vent.

3. The crankcase breather vent of claim 2, wherein the vent base is configured to communicate blow-by gases through the fitting receiver into the interior cavity of the breather vent.

4. The crankcase breather vent of claim 1, wherein the vent base includes an interior cavity in fluid communication with one or more inlets disposed along a side of the vent base and an outlet disposed at a bottom of the vent base.

5. The crankcase breather vent of claim 4, wherein the one or more inlets and the outlet are configured to be coupled with the crankcase by way of hoses.

6. The crankcase breather vent of claim 4, wherein the multiplicity of baffles are disposed within the interior cavity for capturing oil from the blow-by gases.

\* \* \* \* \*